Feb. 13, 1951 J. W. SPEER 2,541,893

SHIP CARGO-HANDLING DEVICE

Filed Dec. 3, 1945 10 Sheets-Sheet 1

INVENTOR.
JAMES W. SPEER
BY John W. Michael
ATTORNEY.

Feb. 13, 1951 J. W. SPEER 2,541,893

SHIP CARGO-HANDLING DEVICE

Filed Dec. 3, 1945 10 Sheets-Sheet 2

INVENTOR.
JAMES W. SPEER
BY John W. Michael
ATTORNEY.

Feb. 13, 1951 J. W. SPEER 2,541,893

SHIP CARGO-HANDLING DEVICE

Filed Dec. 3, 1945 10 Sheets-Sheet 3

INVENTOR.
JAMES W. SPEER

BY John W. Michael

ATTORNEY

Feb. 13, 1951 J. W. SPEER 2,541,893

SHIP CARGO-HANDLING DEVICE

Filed Dec. 3, 1945 10 Sheets-Sheet 4

INVENTOR.
JAMES W. SPEER
BY John W. Michael
ATTORNEY.

SHIP CARGO-HANDLING DEVICE

Filed Dec. 3, 1945 10 Sheets-Sheet 5

INVENTOR.
JAMES W. SPEER
BY John W. Michael
ATTORNEY.

Feb. 13, 1951

J. W. SPEER 2,541,893

SHIP CARGO-HANDLING DEVICE

Filed Dec. 3, 1945

10 Sheets-Sheet 6

INVENTOR.
JAMES W. SPEER
BY John W. Michael
ATTORNEY.

Feb. 13, 1951 J. W. SPEER 2,541,893

SHIP CARGO-HANDLING DEVICE

Filed Dec. 3, 1945 10 Sheets-Sheet 7

INVENTOR.
JAMES W. SPEER

BY John W. Michael

ATTORNEY.

SHIP CARGO-HANDLING DEVICE

INVENTOR.
JAMES W. SPEER
BY John W. Michael
ATTORNEY.

Feb. 13, 1951 J. W. SPEER 2,541,893

SHIP CARGO-HANDLING DEVICE

Filed Dec. 3, 1945 10 Sheets-Sheet 9

INVENTOR.
JAMES W. SPEER
BY
ATTORNEY.

Feb. 13, 1951 J. W. SPEER 2,541,893

SHIP CARGO-HANDLING DEVICE

Filed Dec. 3, 1945 10 Sheets-Sheet 10

INVENTOR.
JAMES W. SPEER

BY

ATTORNEY.

Patented Feb. 13, 1951 2,541,893

UNITED STATES PATENT OFFICE 2,541,893

SHIP CARGO-HANDLING DEVICE

James W. Speer, Easton, Md., assignor to Lake Shore Engineering Company, Iron Mountain, Mich., a corporation of Michigan Application December 3, 1945, Serial No. 632,399

12 Claims. (Cl. 214—15)

This invention relates to improvements in devices for loading and unloading ships, and more particularly to devices in which the entire mechanism is mounted on the ship and is extensible from the ship's hull to either side thereof.

In present day ship construction, the decks and bulkheads divide the hull into holds and the decks are provided with hatches through which cargo is lowered into the holds. When a particular hold is filled, a cover is placed on the deck over such hatch and more cargo is stowed in the next upper hold and even on the cover for the hatch to the lower hold. Proper stowage of cargo is dictated by sailing conditions so that all the cargo for the first and intermediate ports of call is not accessible without shifting some cargo each time unloading and loading is to be done. In cargo vessels where the top deck is relatively clear, it is possible to provide a series of hatches extending both fore and aft from the usual midship superstructure.

In passenger ships, the superstructure extends over the major portion of the top deck, thus leaving only small spaces for hatches. Consequently, only one or two hatches at most are available either fore or aft, and the greater portion of the hold space is "blind" and accessible only by shifting cargo long distances in each hold. Further, if a hold is once filled, it is impossible to gain access to a lower hold except by extensive cargo shifting. Hence, passenger vessels, which must be rapidly loaded and unloaded for economical operation, and cannot spare the time for extensive cargo-loading operations, frequently fail to utilize large hold spaces which could be profitably used excepting for the length of time required by present day loading and unloading methods.

However, when the superstructure prevents the placing of a series of hatches, side ports in the ship's hull at the ends of athwart ship passages may be conveniently used if means are provided for lifting and lowering cargo from and to docks or lighters, for transporting the cargo through the passage to the intermediate deck hatches, and for lowering cargo into and lifting the cargo from the several holds. If such means form a part of the ship's regular equipment, less time is spent in opening and closing the side port openings in the hull than in opening and closing hatches and in preparing the loading and unloading equipment than heretofore, the equipment is always protected from the weather and may be put in readiness for use at any time, and the cargo is handled less and for shorter distances than hereotfore which results in less damage to the cargo. In particular it is possible to use the same means for all hoisting operations which eliminates cargo elevators heretofore required in ships and eliminates the re-handling of cargo from the elevators to trucks, and vice versa. Reduction in the amount of handling required materially speeds the loading and unloading of ships which is particularly important in passenger or combination vessels. And the use of the same equipment permits the handling of heavier and more bulky cargo than heretofore, is particularly adapted to pallet or container handling and shipping of cargo, and allows greater tonnages to be handled in less time and with less effort than heretofore.

It is therefore one object of the present invention to provide a cargo-loading and -unloading device in which the entire necessary mechanism is carried by the ship itself.

Another object of the invention is to provide a cargo-loading and -unloading device in which portions of the device are extensible outboard from either the port or starboard side of the vessel.

Another object of the invention is to provide a cargo-loading and -unloading device which can be continuously kept in readiness for loading and unloading and does not require time and labor when the ship is entering or leaving the port.

Another object of the invention is to provide a cargo-unloading device which operates by way of ports in the sides of the ship and in which all hatches in the top deck for use in handling cargo can be eliminated.

A further object of the invention is to provide a cargo-loading and -unloading device in which a single structure functions both as a hoist for lifting and lowering cargo and as a crane for transporting cargo in a horizontal direction.

Another object of the invention is to provide a cargo-loading and -unloading device in which the cargo may be placed in and removed from any of the ship's holds without shifting cargo in the other holds.

Objects and advantages other than those above set forth will be apparent from the following description when read in connection with the accompanying drawings, in which.

Figures 1, 5:
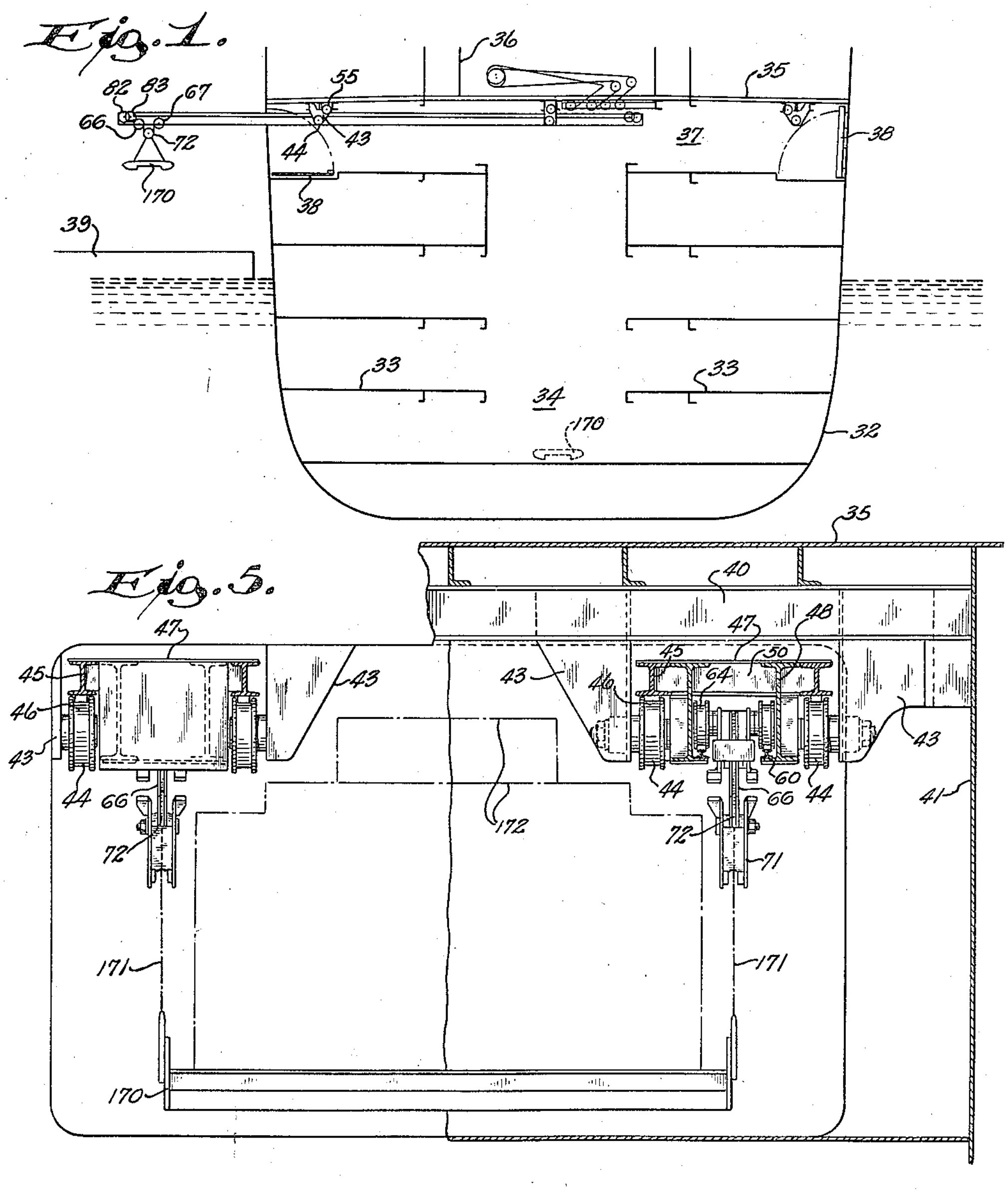
Fig. 1 is a schematic view in cross section of a cargo vessel showing the manner of application thereto of the present invention.
Fig. 5 is an end view of the cargo-transporting device related to a fragment of the vessel and with a loaded pallet in position on the device for movement thereby.

Referring more particularly to the drawings, the numeral 32 designates the hull of a ship having a plurality of intermediate decks 33 accessible by way of hatches 34 adapted to be closed by suitable covers and having a top deck 35, the several decks and the bulkheads extending transversely of the hull dividing the hull into a number of holds. A deckhouse 36, or other suitable inclosure, is placed on the top deck 35 over or adjacent to a passage 37 extending across the beam of the ship below the top deck 35 and provided with openings on both sides of the ship and adapted to be closed by ports 38. The passage 37 extends over the hatches 34 whereby cargo is taken directly from the passage to one of the holds. The numeral 39 designates a dock or lighter onto or into which cargo is to be discharged from the vessel or from which cargo is to be taken into the vessel, by means to be described. The top deck beams 40 or other portion of the ship structure, such as a bulkhead 41, have fixed thereon a plurality of pairs of brackets 43 extending into the passage between the ports. The brackets are suitably braced to maintain parallelism at a predetermined spacing between each pair of and between the several pairs of brackets in a line preferably adjacent each side wall or bulkhead of the passage entirely across the ship.

Figure 13:
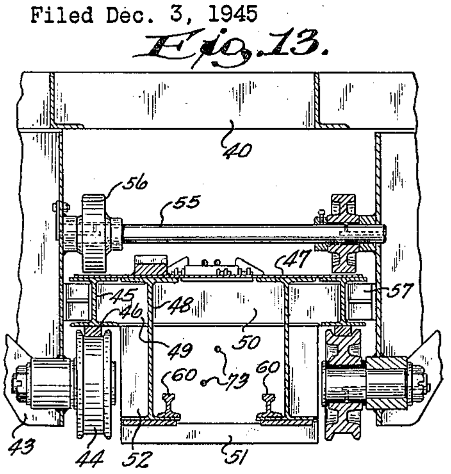
Fig. 13 is a view, partially in elevation and partially in section on the plane XIII–XIII, of Fig. 4.
Figure 14:
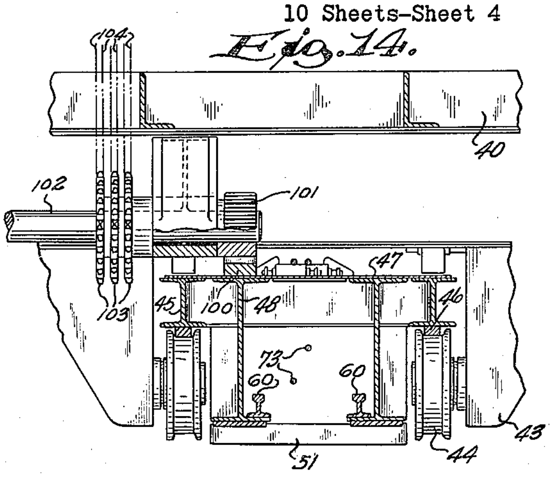
Fig. 14 is a view similar to Fig. 13 but taken on the plane of the line XIV—XIV of Fig. 4.
Figure 6:
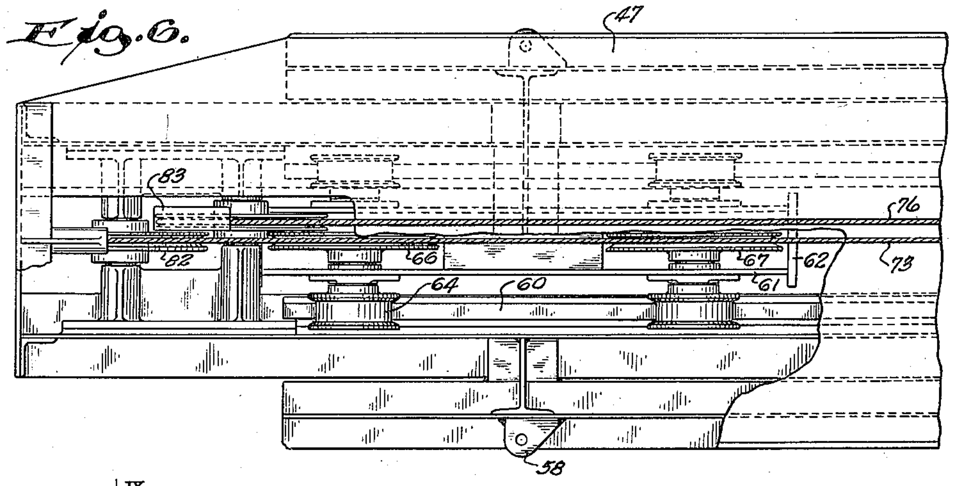
Fig. 6 is a top plan, with portions broken away, of the outboard end of one of two similar boom members.
Figure 7:
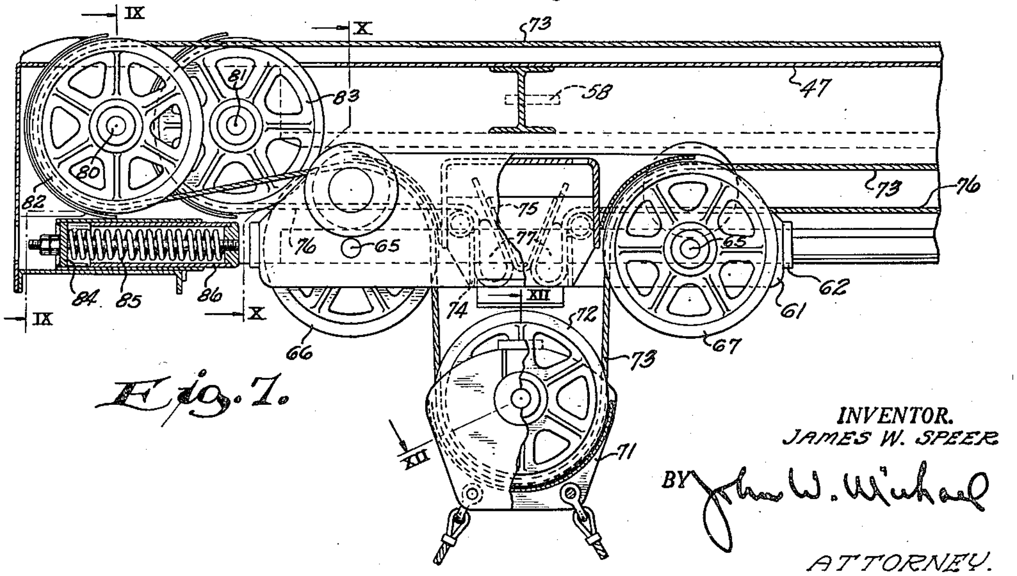
Fig. 7 is a view, partially in elevation and partially in section, of the structure shown in Fig. 6.

Double-flanged wheels 44 are severally rotatably mounted on the brackets and provide lines of wheels extending through the passage. The opposed pairs of wheels carry one of two similar boom members A and B (see particularly Figs. 5, 13 and 14). The boom members severally comprise main beams 45 shown as I beams provided with rails 46 riding between the flanges of the wheels 44 and joined by a top plate 47 to maintain the beams and rails at a given spacing. Auxiliary beams 48 depend from plate 47 and are suitably interconnected and braced with the main beams and with each other, as indicated at 49 and 50. The bottom edges of the auxiliary beams 48 are spaced and braced by bars 51 between the ends of the bottom flanges of beams 48, and braces 52 are also provided between such flanges to provide a structure sufficiently rigid to bear a considerable load even when overhung from the wheels 41. A plurality of axles 55 extend between the several pairs of brackets 43 and are provided with wheels 56 to run in contact with the boom top plate 47 when the boom rests on the flanged wheels 41. Such axles and wheels are so placed as to prevent movement of the boom bars 46 out of the flanges of wheels 44 if weight is overhung on the boom from the pair of wheels 44 closest the side ports. Stop blocks 57, preferably faced with resilient material, extend from the beams 45 to engage with similar blocks on the central bracket 43 if other means for preventing over-traveling of the boom should fail. Undesired movement of the boom is prevented by attaching lugs 58, mounted between the outer flanges of the main beams 45, to similar lugs on the ship structure as by tension rods with turn-buckles, as is well known.

Figures 8, 9, 10, 11, 12:
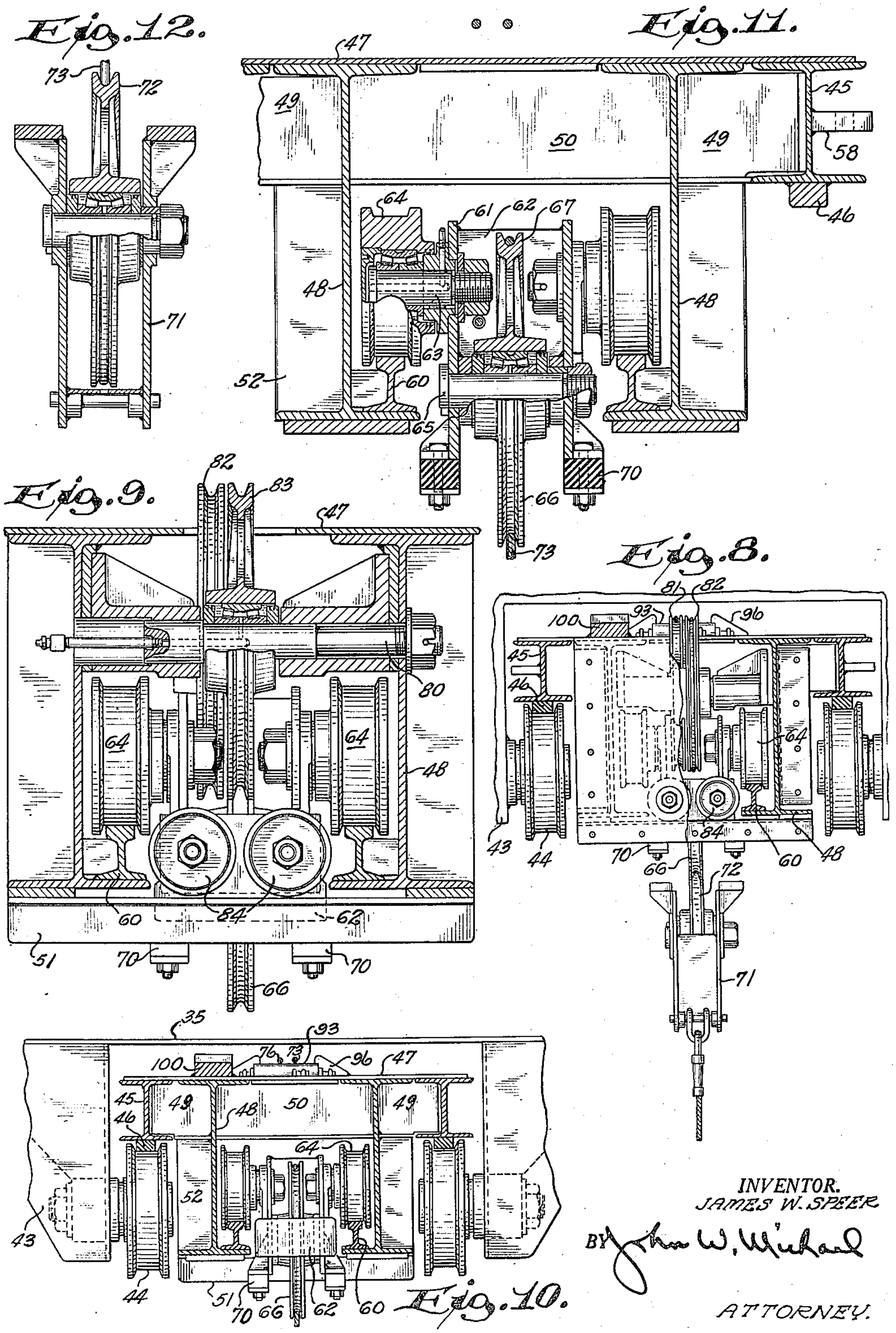
Fig. 8 is an end view, in elevation and with parts broken away, looking at the outboard end, of Fig. 7.
Fig. 9 is a cross sectional view on the broken line IX—IX of Fig. 7.
Fig. 10 is a cross section on the plane of the broken line X—X of Fig. 7.
Fig. 11 is a view partially in elevation and partially in section of a boom member and of a portion of the carriage structure.
Fig. 12 is a cross section taken on the plane of the line XII—XII of Fig. 7 of the movable sheave of the present device.

A pair of rails 60, preferably of ordinary railroad rail section, are fixed on the inner bottom flanges of the boom auxiliary beams 48 to provide a track on which a carriage may be run back and forth for substantially the entire length of each of the boom members. The carriages (see particularly Figs. 6, 7, 9 and 11) include a box-like frame of side plates 61 and end plates 62 in which are fixed stub axles 63 for rotatably carrying double-flanged wheels 64 adapted to run on the rails 60. The wheels 64 are arranged in pairs adjacent the ends of the carriage frame so that considerable weight may be easily supported on each carriage in its movement on the boom rails. The carriage frame has axles 65 fixed therein preferably adjacent the ends of the frames as mountings for a plurality of sheaves 66 and 67. Blocks of resilient material 70 are mounted on the lower edges of the frame side plates to act as buffers for a movable sheave (see Fig. 12) comprising a frame 71 with the sheave 72 rotatably mounted therein, the movable sheave being supported on a cable 73 running over the carriage sheaves 66 and 67. The carriage frame is also provided with a plurality of plates 74 and 75 forming seats for receiving the ends of a cable 76 which ends are severally locked in their seated position by a wedge 77 acting between the plates. The cable 73 is obviously rigged to secure raising and lowering of movable or hoisting sheaves 71, 72 by means to be described, while cable 76 is rigged to cause movement of the carriage to and fro on rails 60 by means to be described.

The outboard end of each boom member is provided with a plurality of axles 80 and 81 on which are severally mounted sheaves 82 and 83, the axles being set as close to each other as consistent with adequate clearance for the sheave peripheries, and the sheaves being mounted on the axles off the center line of the boom members just sufficiently to obtain lateral clearance between the sheaves. Adjacent the sheaves 82 and 83, and in such position as to prevent the carriage from running into such sheaves, are mounted a plurality of buffers severally including tubes 84 mounted on the boom auxiliary beams 48 and severally receiving a compression spring 85 which resists the telescopic movement of a tube 86 into the tube 84. The sheaves 82 carry the cable 73 while sheaves 83 carry the cable 76 to secure movement of hoisting sheave 71, 72 and movement of the carriage, respectively.

Figure 15:
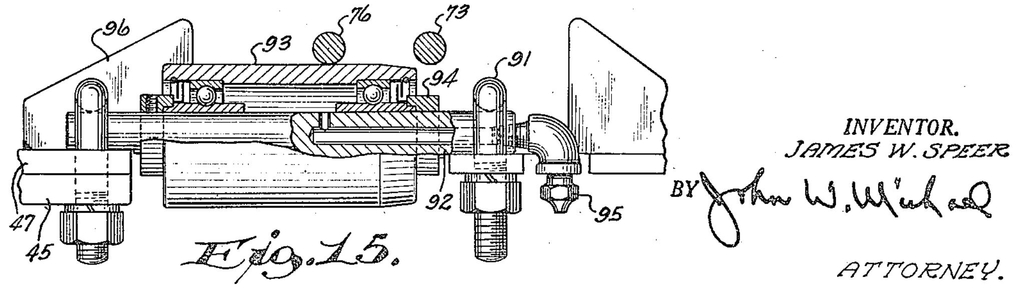
Fig. 15 is a view, partially in section and partially in elevation, of one of the roller assemblies, indicated in Fig. 3 at XV, for carrying the various reaches of cable between the several sheaves.
Figure 2:
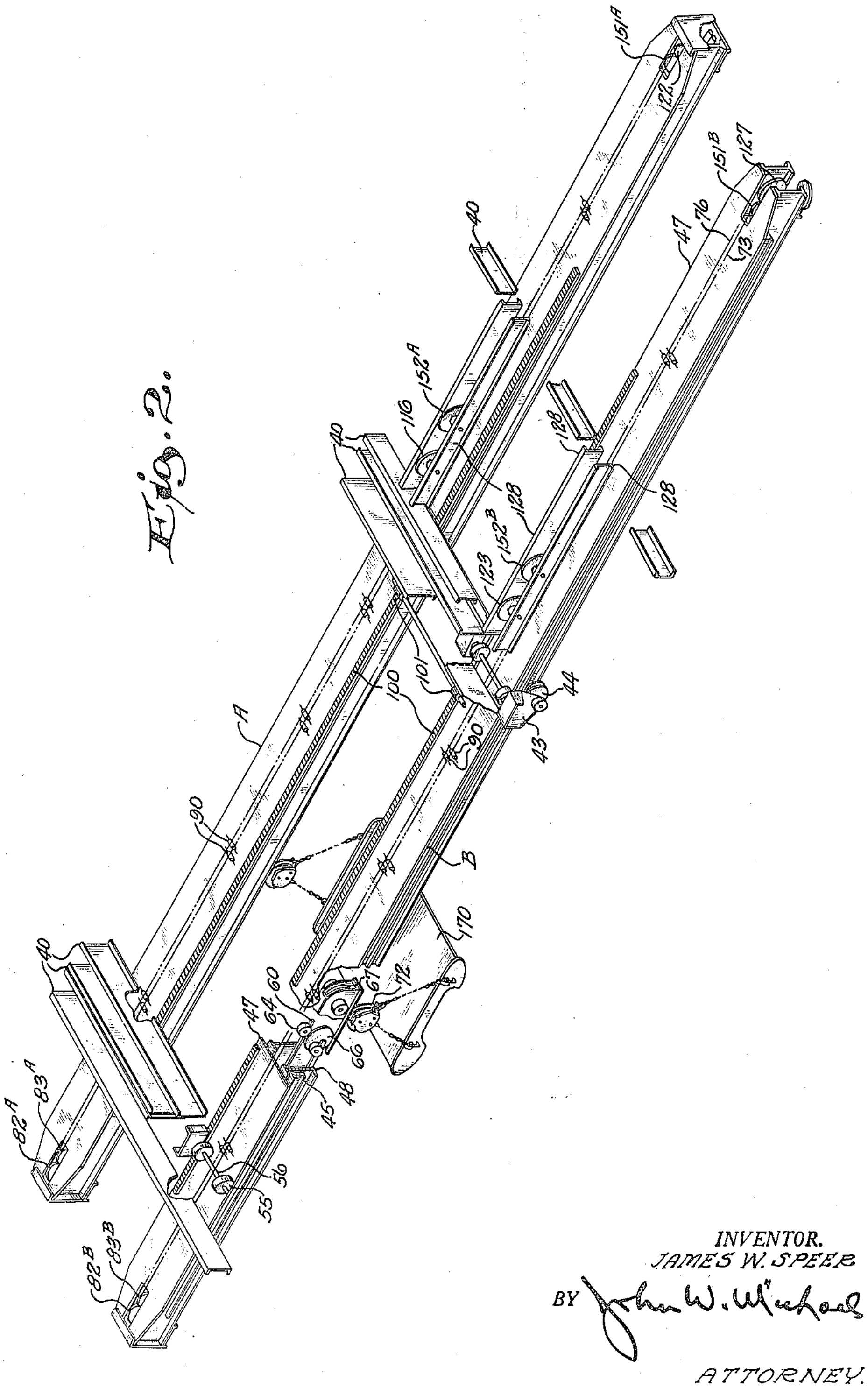
Fig. 2 is a perspective view, with portions broken away, of a major sub-assembly of the present invention.
Figure 3:
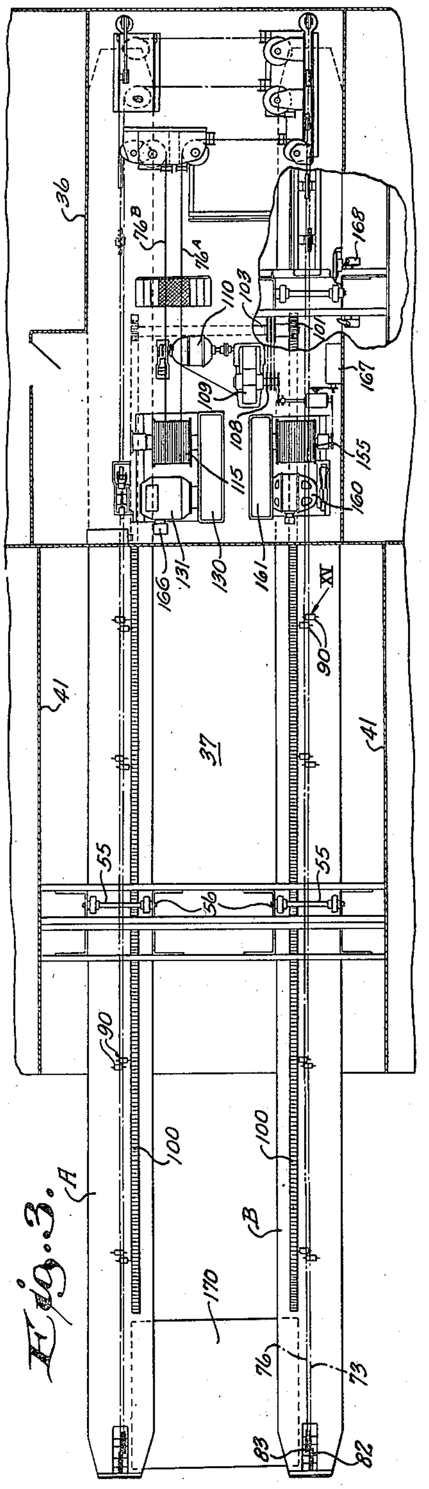
Fig. 3 is a fragmentary top plan view of a vessel with portions of the top deck broken and cut away to illustrate the relation of elements of the present invention in cargo-transporting position.

A plurality of pairs of rollers are mounted on the upper surface of each boom, as indicated at 90 in Figs. 2 and 3, the detailed construction of the individual rollers being shown in Fig. 15. U bolts 91 pass through the boom top plate 47 and/or top flanges of the boom main beams 45 to position an axle 92 on which is mounted a roller 93. Such roller is positioned against lateral movement on the axle by collars 94 and is mounted on a well-known form of ball bearing. The rollers are preferably hollow and may be filled with lubricant via a fitting 95 connecting with a passage through the axle into the roller. It will be seen that the several rollers of each pair are offset relative to each other so that each roller preferably carries a portion of only cable 76 or 73. Guides 96 are mounted on the boom adjacent the ends of each pair of rollers to minimize slippage of the cables from the rollers and to return the cables if they should whip off the rollers.

Each of the boom members has a rack 100 mounted on the boom top plate 47, the racks extending for the greater portion of the length of each boom member. The racks severally mesh (see Fig. 14) with gears or pinions 101 on a common shaft 102 which also carries a plurality of sprockets 103 severally connected by way of chains 104 with sprockets 108 (see Fig. 3) on the output shaft of a gear transmission 109 driven by an electric motor 110. The motor is reversible and permits racking the boom members back and forth simultaneously to extend the boom beyond either side of the ship or to retract the boom entirely into the ship. The reeving of the cables 73 and 76, and the manner in which the cables are wound and unwound, can be seen by reference to Figs. 16 and 17, respectively.

The carriages are designated A and B and may be run back and forth on the boom rails 60 by the duplicate cables 76, the ends of the several cables being fixed into the several cable seats 74, 75 on the carriages to make each cable function as an endless cable. The duplicate parts already described are designated by the reference numerals already used and are differentiated by letters A and B to designate the same parts associated with the several carriages A and B, the several parts being shown only diagrammatically in Fig. 16 for clarity in the drawings. The two cables are wound and unwound simultaneously on a single drum 115, which, being placed substantially over one of the boom members, requires that the cables be differently reeved over several sets of sheaves to secure proper running of the cables to the several carriages and to the drum. Cable 76A is fixed at the ends on carriage A and extends over sheave 83A on boom member A and from thence passes over sheaves 116, 117, 118 to drum 115, and from the drum such cable passes over sheaves 119, 120, 121, and 122 which brings the cable back to the carriage A where the other end of the cable is fixed. Cable 76B extends from its end on carriage B over sheave 83B and over sheaves 123 and 124 which alone bring the cable into position to wind on drum 115. From the drum the cable 76B extends over the sheaves 125, 126 and 127 and is fastened at its other end on carriage B. Sheaves 116 and 121 for boom member A and sheaves 123 and 126 for boom member B are preferably mounted in suitable brackets 128 on the several booms and sheaves 122 and 127 are severally mounted in the ends of boom members A and B while the remaining sheaves are mounted in the deck house.

Figure 4:
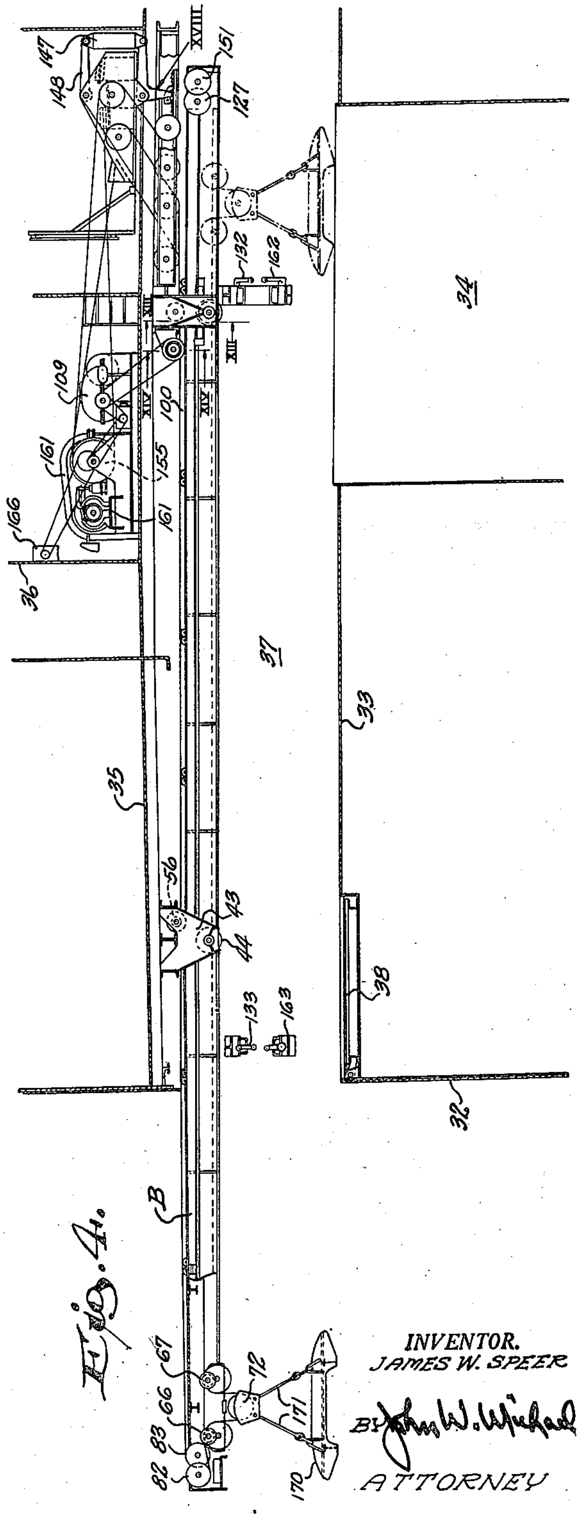
Fig. 4 is a fragmentary cross section of a vessel with the cargo-transporting device in side elevation and in the position shown in Fig. 3.

It will be seen by referring to Fig. 3 that the drum 115 is connected by way of a gear transmission, indicated at 130, with driving means such as an electric motor 131. The motor is of the reversible type controllable (see Fig. 4) from a controller 132 mounted adjacent the hatches 27 and from either of two similar controllers 133 severally mounted adjacent the ports in the side of the ship. The several controllers are interlocked so that the operator of any one control station may take control of the carriages and lock out the other control station while movement of the carriages is within the clearest view of the operator taking control of such movement.

Figure 18:
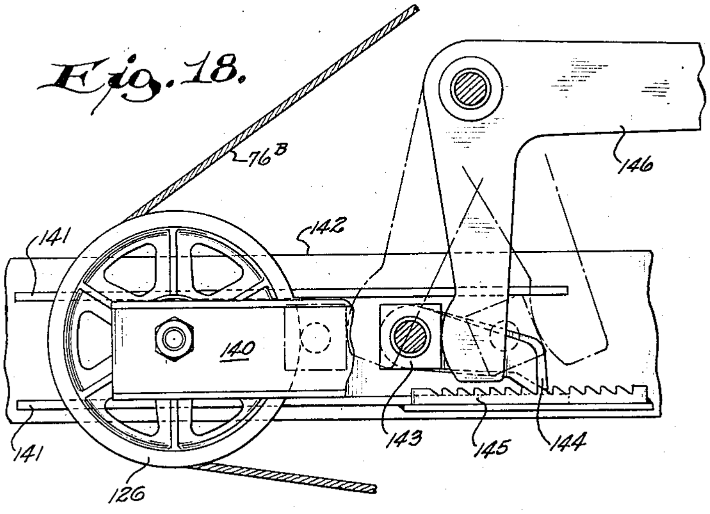
Fig. 18 is an enlarged fragment, in elevation, of a cable-tensioning device, generally indicated at XVIII in Fig. 4.
Figure 19:
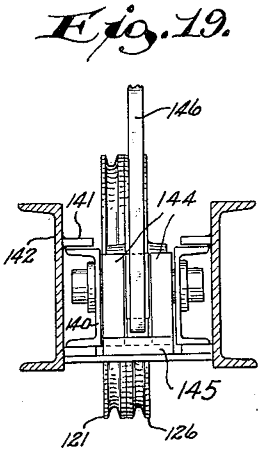
Fig. 19 is an end view of the cable-tensioning device shown in Fig. 18.

To secure simultaneous movement of carriages A and B, it is necessary, of course, that cables 76A and 76B be equally tensioned. The tension of the cables is adjusted as nearly as possible to the same initial value, but tension-adjusting means must be provided and such means are associated with sheaves 121 and 126 for the cables 76A and 76B, respectively, such devices being herein shown in Figs. 18 and 19 and now to be described. The sheaves 121 and 126 are in fact one sheave, being diagrammatically shown as separate sheaves in Fig. 16 only for clarity in illustration of the reeving of cables 76, and are mounted on a cross head 140 which is movable in slides 141 on brackets 142 fixed on the sheave brackets 128 and adjacent drum 115. A block 143 is pivoted on the cross head and the block pivot bears pawls 144 engageable with a ratchet 145 on the brackets 142. One pawl is one-half ratchet tooth longer than the other so that cable slack is taken up by increments of one-half of the ratchet tooth pitch. One arm of a bell crank 146 bears on the block while the other arm of the bell crank has one end of a weight 147 (see Fig. 4) pivoted thereto, the other end of the weight being pivoted on a link 148 pivoted on a fixed portion of the structure. The weight acts on the bell crank to rotate the crank about its pivot and to press the crosshead and the pawl block from the dot-dash line right hand position of the pawl block to the full line position shown in Fig. 18, at which time the remaining initial slack in the cables 76 has been taken up. In moving from one position to the other to take up cable slack, crank 146 pivots to allow movement of block 143 necessary to move the pawls 144 over the ratchet 145. Movement of the block and pawls may continue toward the left until the slack in the cable, during operation, is completely taken up by the weight. A pull on the cables 76 tends to move crosshead 140 toward the right, seats one of the pawl ends into the ratchet and prevents retrogressive movement of the sheave 121, 126.

Figures 16, 17:
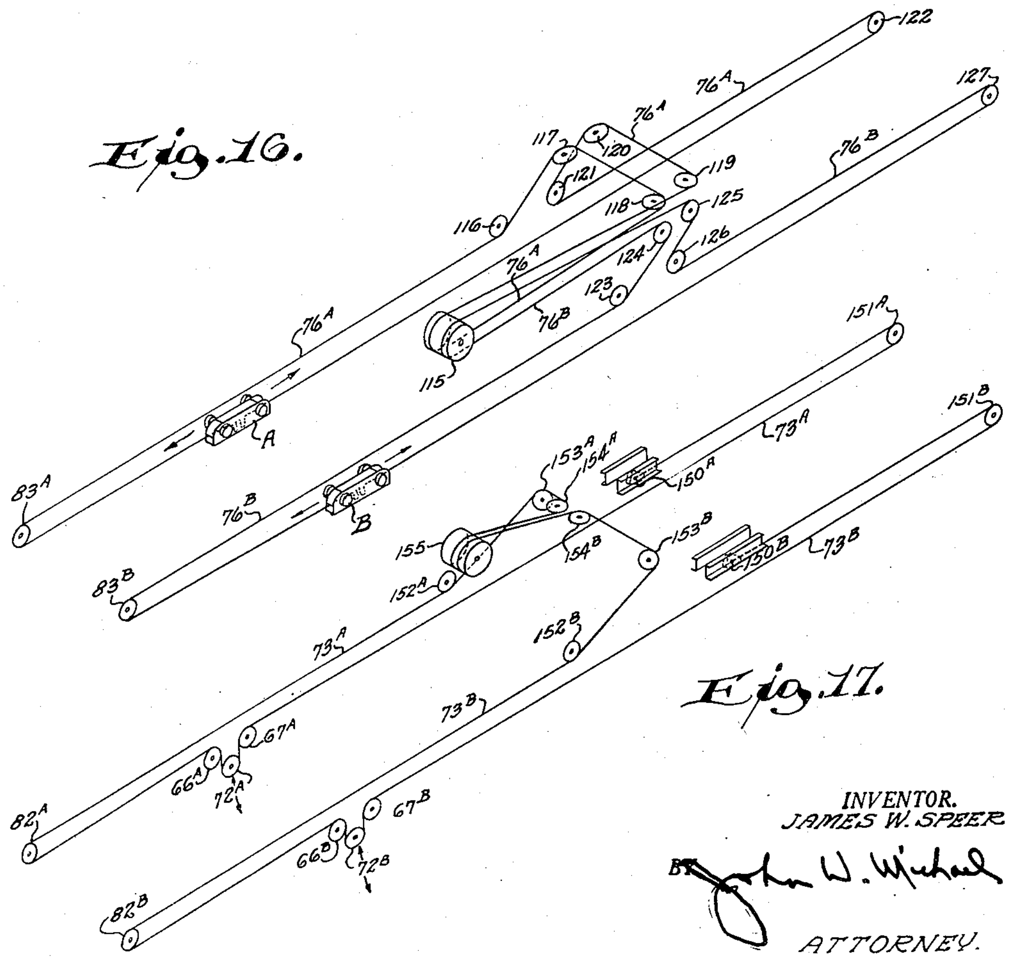
Fig. 16 is a diagram showing the manner of reeving the cables for operating the several carriages on the boom members.
Fig. 17 is a diagram showing the manner of reeving the cables for operating the movable sheaves severally suspended from the carriages.

Hoisting of a load requires raising and lowering of sheaves 72 which are also designated A and B in Fig. 17 as being parts of the several boom members A and B and of the carriages A and B. The cables 73A and 73B in Fig. 17, respectively, lift and lower the sheaves 72A and 72B, one end of each of the cables being anchored at a suitable location adjacent the several boom members, as indicated at 150A and 150B. The several cables 73 extend from their anchors over the several sets of sheaves 151, 67, movable sheaves 72, sheaves 66, 82, 152, 153, and 154, to a drum 155, common to both cables, and on which the cables are wound or unwound to hoist or lower a load as the drum is rotated in either of its directions of rotation.

The drum 155 is driven by suitable mechanism also located in the deck house and comprising a reversible type electric motor 160 connected with the drum by way of a suitable gear transmission 161. Energization of the motor 160 may be selectively controlled from a controller 162 (see Fig. 4) at the hatches and a plurality of similar controllers 163 severally mounted adjacent the side ports. It will be understood that the several above controllers are likewise capable of individually taking over the control of the hoisting motor and locking out the other controllers dependent on whether the sheaves 72 and their load are within the clearer view of one or the other of the operators. The circuits of all of the motors may also be suitably interlocked to prevent simultaneous energization of several motors, and in any event each of such circuits is provided with a suitable limit switch, indicated at 166, 167, and 168, to prevent movement of the booms, the carriages and the hoisting sheaves beyond given positions.

Although the several motors and drums are shown mounted in a house on the top deck 28, such elements may be located wherever desired, limited only by practical considerations in reeving the cables to the drums. The electrical circuits and the details of the electrical devices employed in controlling the operation of the motors are not a part of the present invention and are accordingly not disclosed herein, disclosure being made only of the manner of operation of the system insofar as required to obtain an understanding of the present device.

Figures 20, 21, 22, 23:
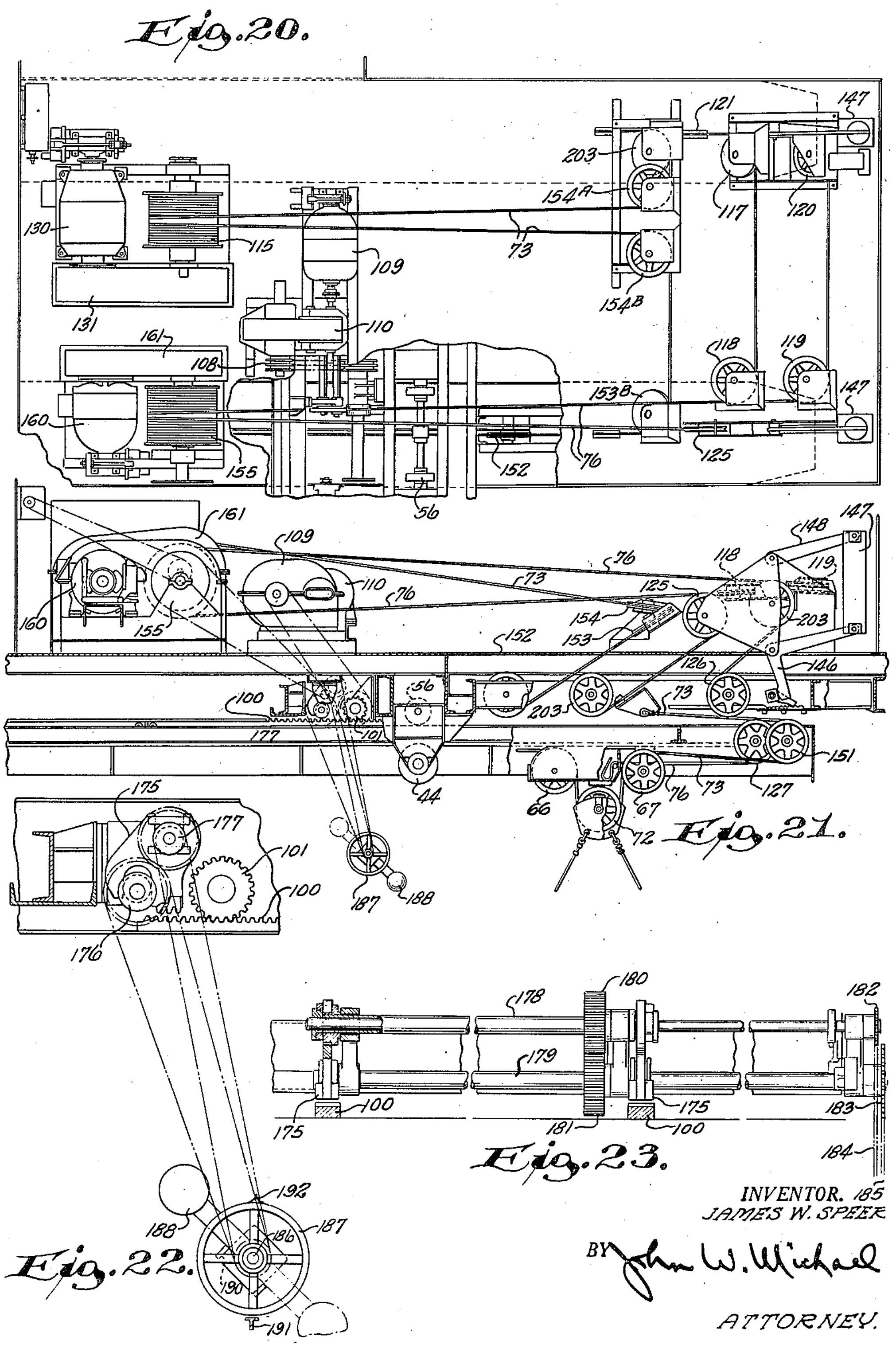
Fig. 20 is a top plan view of a boom-racking and cable-winding mechanism and some of the cable sheaves.
Fig. 21 is a side elevation of Fig. 20.
Fig. 22 is an enlarged fragment of Fig. 21 to illustrate means for locking the boom in any desired position.
Fig. 23 is a side elevation of a portion of the mechanism shown in Fig. 22.

The boom members A and B are locked against movement in any desired position by spud locks 175 (see Figs. 21, 22, and 23), the teeth of which are individually engageable with the several racks 100. The locks are mounted on eccentrics 176 and 177 fixed on shafts 178 and 179, respectively, which are suitably mounted on the ship structure in adjacent relation and are interconnected by gears 180 and 181. The shaft 178 bears a sprocket wheel 182 and shaft 179 bears sprocket wheel 183, the wheels being connected by way of chains 184 and 185 with sprockets on the shaft 186 of a hand-wheel 187 mounted on the side of the passage 30. A weighted lever 188 is mounted on the shaft 186 to pivot into contact with lugs 190 on the hand-wheel and to engage with a stop 190 limiting the degree of rotation of the hand-wheel.

When the locks are to be engaged with the racks, the weighted lever 188 is rotated clockwise into the dot-dash position shown. If the lever engages the stop 191, the rack and lock teeth are engaged and the booms are locked in position.

If the lever does not engage such stop, the hand-wheel must be rotated in one direction or the other to shift the locks along the racks. The direction of movement required of the hand-wheel is shown by the position of an indicator 192 and the wheel may be moved in either direction when such indicator is on the vertical center line of the wheel. If the indicator is to either side of such center line, the wheel must be moved in such direction as to bring the indicator to and even beyond the center line under some conditions. Such movement of the wheel rotates both eccentrics, the eccentric 176 moving the locks longitudinally of the racks, while the eccentric 177 moves the locks up and down relative to the racks. The several eccentrics are simultaneously movable so that the lock teeth are brought into meshing position with the rack teeth and the locks are moved downwardly to bring the teeth thereof simultaneously into engagement with the racks.

The structure herein disclosed is utilized to serve both sides of the ship and is preferably duplicated at a sufficient number of locations to give access to all the blind hold space without excessive shifting of cargo. In operation, when the ship is brought into a berth with a dock or lighter available only on one side of the ship, the port 38 on that side is opened and the stowing lugs 58 are released. Motor 110 is then energized to drive the pinion 100 which racks the boom outboard through the port for any desired distance up to the maximum shown in Figs. 3 and 4. The motor 110 is then deenergized and the spud locks are operated to hold the boom members in that position. Assuming that the carriages are located adjacent the side port and have been carried outboard with the boom to the position shown in full line in Fig. 4, the motor 131 is then energized to unwind cables 73 which allow sheaves 72 to drop down to the dock or lighter where cargo is loaded on a pallet 170 suspensible by ropes 171 from the sheaves 72. (Such load may not extend beyond the profile indicated at 172 in Fig. 5 to avoid interference between the load and the boom members and their mounting above described.) The motor 131 is then reenergized to wind up cables 73 which hoists the load from the dock or lighter to the position shown in Figs. 4 and 5. Motor 131 is then deenergized and motor 160 is energized to wind up cables 76 which pull the carriages from the full line position shown in Fig. 4 to the dot-dash line position shown in such figure. Deenergization of motor 160 now permits reenergization of motor 131 to lower the load through the hatches 34 to the desired hold where the loaded pallet 170 is replaced by an unloaded pallet for continued cargo-loading while the cargo on the loaded pallet is stowed in the hold. In unloading a ship, the operations will, of course, be exactly the reverse of those above described.

If the ship is placed in a berth with a dock or lighter available on both sides of the ship, cargo may be taken from either dock or lighter as desired. In such case, it is merely necessary to reverse the direction of rotation of motor 110 to rack the booms into and through the ship from the one side through the port on the side from which cargo is to be taken at a given moment. In all of the above operations it is desirable that the hoisting operation from the dock or lighter take place under the control of the operator at the ship's side stations 133, 163, while hoisting into and from the holds is preferably under the control of the operator at the midship station 132, 162. Control of the carriages may pass from one operator to another as the load passes into the ship or as the empty pallet returns to the side port for lowering to the dock and without interruption of movement.

If the ship is so constructed as to provide space for the operating equipment beneath the deck carrying the booms, and adjacent to the passage in which the booms are operated, the modified structure shown in Figs. 24–28 is used. In such modification, the various details of the structure are similar to those already described and the same reference numbers are used for similar parts.

Figures 24, 25, 26:
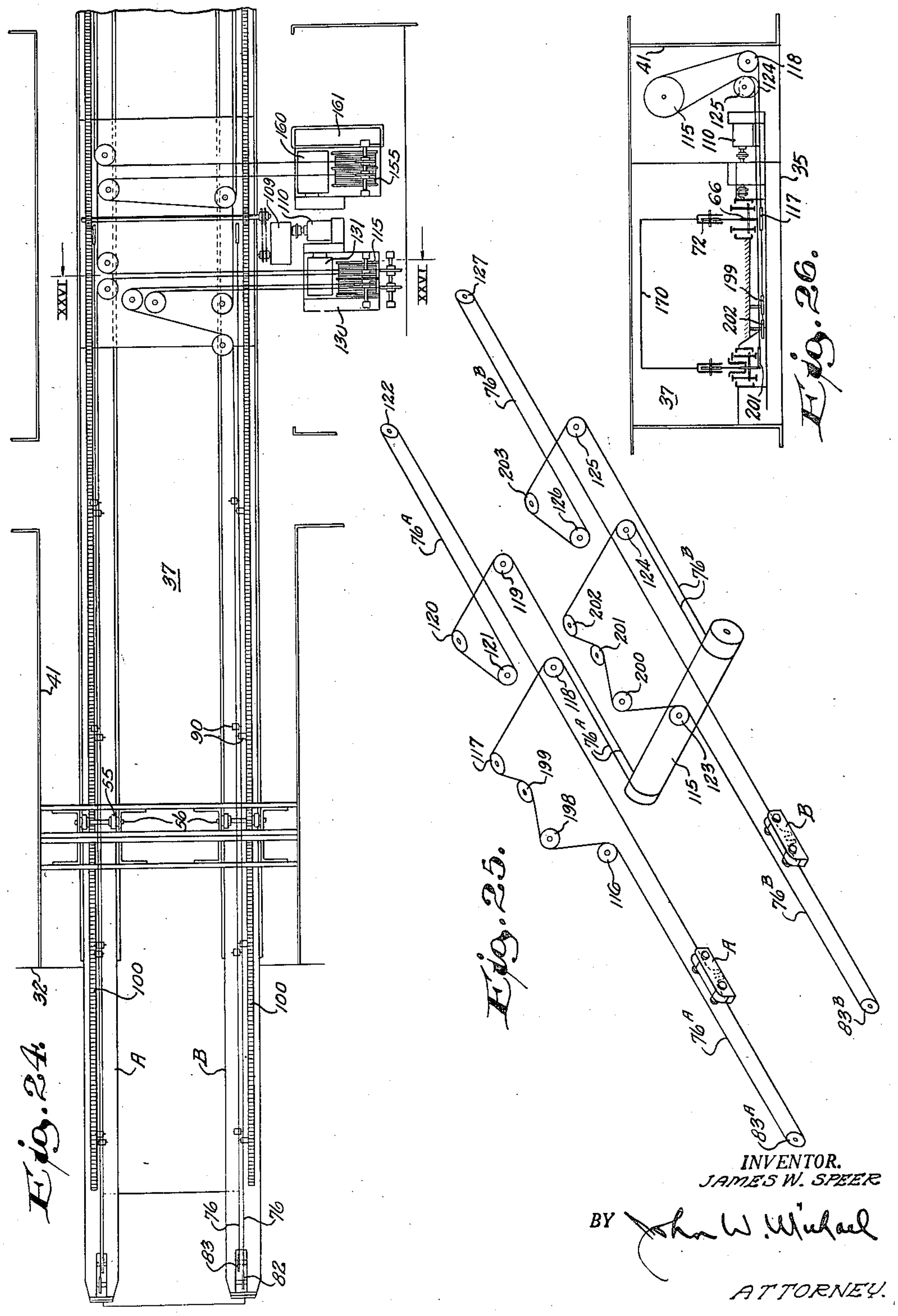
Fig. 24 is a modified arrangement of the devices of the present invention in which parts previously mounted above the top deck are arranged below such deck and in adjacent rather than superposed relation to other parts of the structure.
Fig. 25 is a diagram showing the carriage cable reeving employed in the structure in Fig. 24.
Fig. 26 is a diagram in side elevation showing the location of some of the sheaves indicated in Fig. 25.
Figures 27, 28:
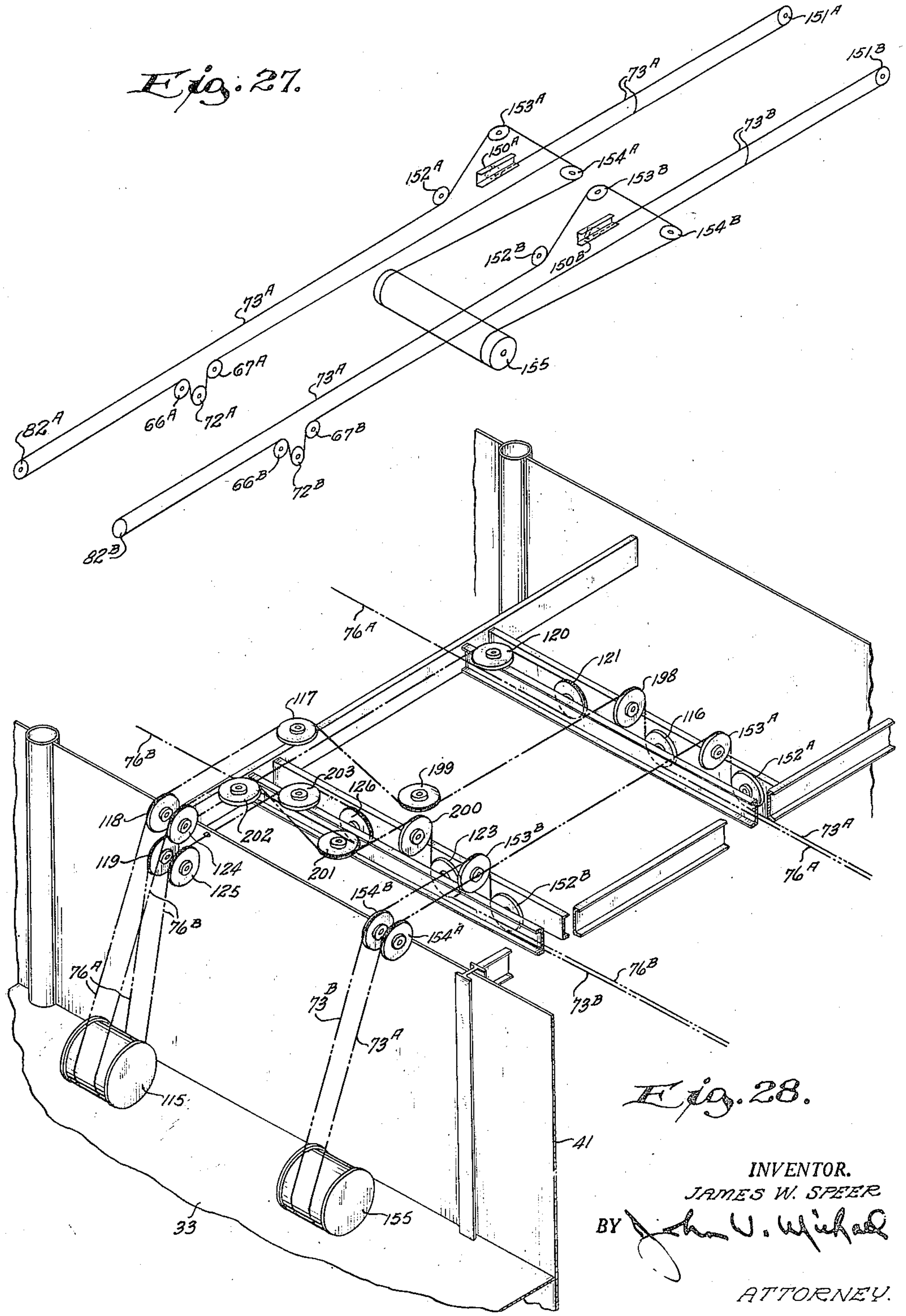
Fig. 27 is a diagram showing the hoisting cable reeving of the modification shown in Figs. 24 and 25.
Fig. 28 is a partial perspective view showing the arrangement of the fixed sheaves in the modified form of the invention.

The reeving of the carriage cables in the present instance is, however, materially different from that above disclosed, as shown in Fig. 25, in which the cable 76A passes from the carriage A over the sheave 83A on the end of the boom member A, over sheaves 116, 198, 199, 117, and 118 to the drum 115 over which the rope passes to sheave 119 around sheaves 120 and 121 and over sheave 122 back to the carriage A. Cable 76B likewise extends from the carriage B over sheaves 83B, 123, sheaves 200, 201, and 202, and 124, to the drum 115, over which the cable passes to the sheaves 125, 203, 126, and 127, back to the carriage B. It will thus be seen that two additional sheaves are required for cable 76A and that four additional sheaves are required for cable 76B, as compared to the sheave arrangement shown in Fig. 16. The reeving for the hoisting cables 73A and 73B, as shown in Fig. 27, is similar to that shown in Fig. 17 for the first modification of the invention but the arrangement of such sheaves is quite different. The relative arrangement and functions of the several sets of sheaves are shown in Fig. 28 in which the same reference numerals are applied as are used in Figs. 25 and 27. However, it will be understood that the distances between the several sheaves and the location of the sheaves in space are actually those shown in Figs. 20 and 21. The sheave-tensioning devices employed in the present modification of the invention are precisely the same as those above described, and the parts thereof are accordingly identified by the same reference numerals.

Figure 29:
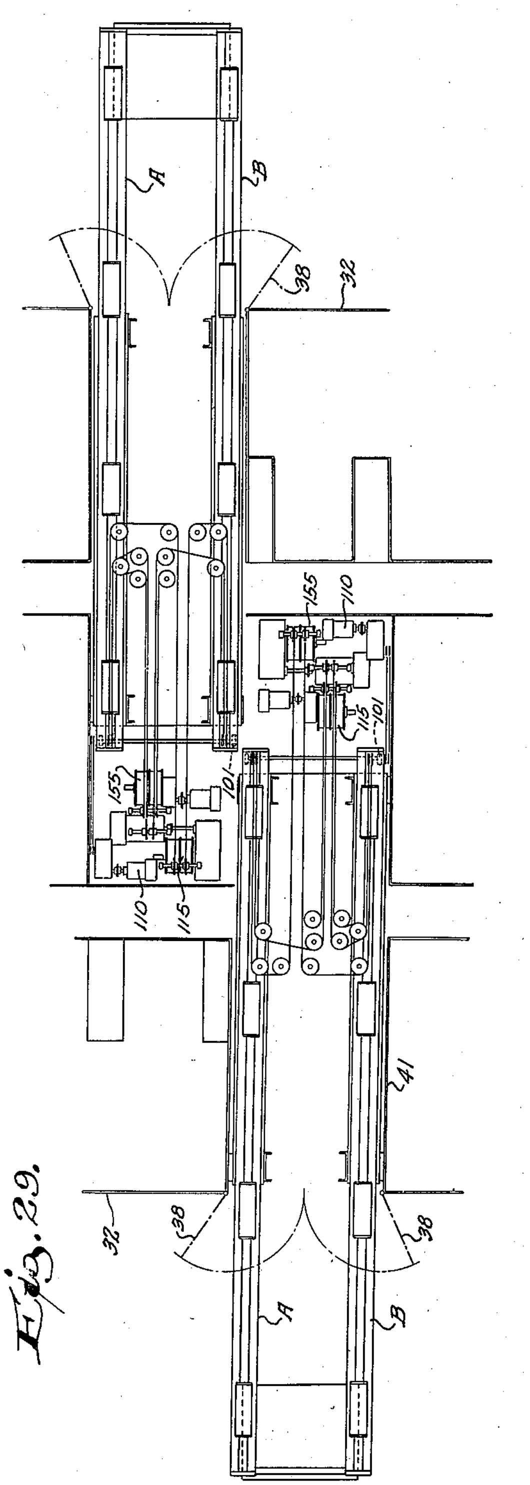
Fig. 29 is a modification of the present invention, shown diagrammatically, in which duplicate structures are employed to transport cargo to and from either side of the ship.
Figure 30:
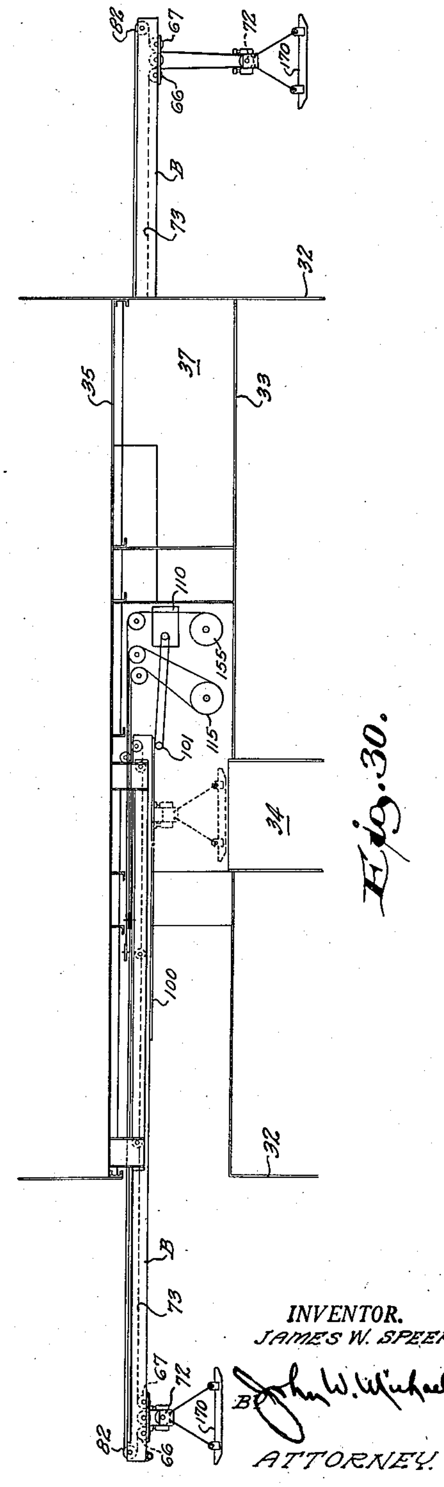
Fig. 30 is a side elevation of the structure shown in Fig. 29.

In some existing ships it is impossible or undesirable to provide passages 37 extending entirely across the beam of the ship, or it may be desired to provide for loading and unloading at different points on the two sides of the ship. In such cases, separate structures are provided for each side and are arranged in offset relation with the operating mechanism for each structure placed behind and below the booms, as shown in Figs. 29 and 30, which arrangement necessarily changes the reeving for the carriage cables and the hoist cables. Again, the structural details of the mechanism in the present modification are generally similar to that described in Figs. 1 to 19, inclusive, excepting that the boom racks 100 are now mounted on the bottoms of the booms to clear the space above the booms for the operating cables for the carriages and the hoist sheaves. The reeving of cables 73 and 76 is now simpler than even that shown in the first modification of the invention. It will be understood that each boom structure now has its own set of drums and drives for the cables and that a separate rack drive is also provided for each of the booms. The several operating mechanisms are, however, similar to those already described and are hence designated by the same reference numerals.

Although but a few embodiments of the present invention have been illustrated and described, it will be apparent to those skilled in the art that various changes and modifications may be made therein without departing from the spirit of the invention or from the scope of the appended claims.

I claim:

1. The combination with a ship having transverse bulkheads defining an athwart passage between decks, a hatch from the passage to the hold spaces, and a port in the side of the ship at the end of the passage for access to the exterior of the ship, of a ship-carried crane for handling cargo, said crane comprising, a pair of separate, independent booms in the passage, means movably mounting said booms in said passage parallel to each other and in substantial alignment with the upper corners of the port, power means for simultaneously moving said booms on said mounting means to project the booms out of said port, a pair of separate, independent trolleys each being mounted on one of the booms for movement along the boom, power means for simultaneously moving said trolleys along the booms, a hoist sheave block depending from each of said trolleys, power means for simultaneously actuating said blocks, and cargo slings depending from each block to support a load therebetween.

2. The combination with a ship having transverse bulkheads defining an athwart passage between decks, a hatch from the passage to the hold spaces, and a port in the side of the ship at the end of the passage for access to the exterior of the ship, of a ship-carried crane for handling cargo, said crane comprising, a pair of separate, independent, hollow booms in the passage, a longitudinal slot in the underside of the boom, means movably mounting said booms in said passage parallel to each other and in substantial alignment with the upper corners of the port, power means for simultaneously moving said booms on said mounting means to project the booms out of said port, a trolley movably mounted in each of said hollow booms and depending from the boom through said slot, the trolley in each boom being independent of the other, power means for simultaneously moving said trolleys along the booms, a hoist sheave block depending from each of said trolleys, power means for simultaneously actuating said blocks, and cargo slings depending from each block to support a load therebetween.

3. The combination with a ship having transverse bulkheads defining an athwart passage between decks, a hatch from the passage to the hold spaces, and a port in the side of the ship at the end of the passage for access to the exterior of the ship, of a ship-carried crane for handling cargo, said crane comprising, a pair of separate, independent booms in the passage, means movably mounting said booms in said passage parallel to each other and in substantial alignment with the upper corners of the port, power means for simultaneously moving said booms on said mounting means to project the booms out of said port, a pair of separate, independent trolleys each being mounted on one of the booms for movement along the boom, power means for simultaneously moving said trolleys along the booms, a hoist sheave block depending from each of said trolleys, power means for simultaneously actuating said blocks, and cargo slings depending from each block to support a load therebetween, all of said power means being operable separately or simultaneously without one affecting the operation of another.

4. The combination with a ship having transverse bulkheads defining an athwart passage between decks, a hatch from the passage to the hold spaces, and a port in the side of the ship at the end of the passage for access to the exterior of the ship, of a ship-carried crane for handling cargo, said crane comprising, a pair of separate, independent booms in the passage, means movably mounting said booms in said passage parallel to each other and in substantial alignment with the upper corners of the port, power means for simultaneously moving said booms on said mounting means to project the booms out of said port, a pair of separate, independent trolleys each being mounted on one of the booms for movement along the boom, power means for simultaneously moving said trolleys along the booms, a hoist sheave block depending from each of said trolleys, power means for simultaneously actuating said blocks, and cargo slings depending from each block to support a load therebetween, all of said power means being mounted in said ship exteriorly of said passage and being controlled within the passage.

5. The combination with a ship having transverse bulkheads defining an athwart passage between decks, a hatch from the passage to the hold spaces, and a port in the side of the ship at the end of the passage for access to the exterior of the ship, of a ship-carried crane for handling cargo, said crane comprising, a pair of separate, independent booms in the passage, means movably mounting said booms in said passage parallel to each other and in substantial alignment with the upper corners of the port, power means for simultaneously moving said booms on said mounting means to project the booms out of said port, a pair of separate, independent trolleys each being mounted on one of the booms for movement along the boom, power means for simultaneously moving said trolleys along the booms, a hoist sheave block depending from each of said trolleys, power means for simultaneously actuating said blocks, cargo slings depending from each block to support a load therebetween, and means for locking said booms in any position with respect to said passage.

6. The combination with a ship having transverse bulkheads defining an athwart passage between decks, a hatch from the passage to the hold spaces, and a port in the side of the ship at each end of the passage, of a ship-carried crane, comprising, a pair of separate, independent booms in the passage, means movably mounting said booms in said passage parallel to each other in alignment with the upper corners of said ports, power means for simultaneously moving said booms on said mounting means in the same direction and amount to project the boom ends out of either of the ports, a pair of separate, independent trolleys each being mounted on one of the booms for movement over the length of the booms, power means for simultaneously moving said trolleys along the booms, a hoist sheave block depending from each of said trolleys, power means for simultaneously actuating said blocks, and cargo slings depending from each block to support a load therebetween, said booms being of such length that adjacent ends may project from one of the ports while the other ends overlie said hatch, thus permitting the trolleys to transport loads between the outside of the ship and the hatch without boom movement.

7. The combination with a ship having transverse bulkheads defining an athwart passage between decks, a hatch from the passage to the hold spaces, and a port in the side of the ship at each end of the passage, of a ship-carried crane, comprising, a pair of separate, independent booms in the passage, means movably mounting said booms in said passage parallel to each other in alignment with the upper corners of said ports, power means for simultaneously moving said booms on said mounting means in the same direction and amount to project the boom ends out of either of the ports, a pair of separate, independent trolleys each being mounted on one of the booms for movement over the length of the booms, a cable reeved on each boom and to the corresponding trolley, power means for simultaneously actuating the cable on each boom to move the trolleys along the booms, cable tensioning means acting on each cable to insure moving the trolleys in unison and to the same extent, a hoist sheave block depending from each of said trolleys, power means for simultaneously actuating said blocks, and cargo slings depending from each block to support a load therebetween.

8. The combination with a ship having transverse bulkheads defining an athwart passage between decks, a hatch from the passage to the hold spaces, and a port in the side of the ship at the end of the passage for access to the exterior of the ship, of a ship-carried crane for handling cargo, said crane comprising, a pair of separate, independent booms in the passage, means movably mounting said booms in said passage parallel to each other and in substantial alignment with the upper corners of the port, power means for simultaneously moving said booms on said mounting means to project the booms out of said port, a pair of separate, independent trolleys each being mounted on one of the booms for movement along the boom, a cable reeved on each boom and to the corresponding trolley, power means for simultaneously actuating the cable on each boom to move the trolleys along the booms, cable tensioning means acting on each cable to insure moving the trolleys in unison and to the same extent, a hoist sheave block depending from each of said trolleys, power means for simultaneously actuating said blocks, and cargo slings depending from each block to support a load therebetween.

9. The combination with a ship having transverse bulkheads defining an athwart passage between decks, at hatch from the passage to the hold spaces, and a port in the side of the ship at each end of the passage, of a ship-carried crane, comprising, a pair of separate, independent booms in the passage, means movably mounting said booms in said passage parallel to each other in alignment with the upper corners of said ports, power means for simultaneously moving said booms on said mounting means in the same direction and amount to project the boom ends out of either of the ports, a pair of separate, independent trolleys each being mounted on one of the booms for movement over the length of the booms, a cable reeved on each boom and to the corresponding trolley, power means for simultaneously actuating the cable on each boom to move the trolleys along the booms, cable tensioning means acting on each cable to insure moving the trolleys in unison and to the same extent, a hoist sheave block depending from each of said trolleys, power means for simultaneously actuating said blocks, and cargo slings depending from each block to support a load therebetween, said booms being of such length that adjacent ends may project from one of the ports while the other ends overlie said hatch, thus permitting the trolleys to transport loads between the outside of the ship and the hatch without boom movement.

10. The combination with a ship having transverse bulkheads defining an athwart passage between decks, a hatch from the passage to the hold spaces, and a port in the side of the ship at each end of the passage, of a ship-carried crane, comprising, a pair of separate, independent booms in the passage, means movably mounting said booms in said passage parallel to each other in alignment with the upper corners of said ports, power means for simultaneously moving said booms on said mounting means in the same direction and amount to project the boom ends out of either of the ports, a pair of separate independent trolleys each being mounted on one of the booms for movement over the length of the booms, a cable reeved on each boom and to the corresponding trolley, power means for simultaneously actuating the cable on each boom to move the trolleys along the booms, cable tensioning means acting on each cable to insure moving the trolleys in unison and to the same extent, a hoist sheave block depending from each of said trolleys, power means for simultaneously actuating said blocks, and cargo slings depending from each block to support a load therebetween, said booms being of such length that adjacent ends may project from one of the ports while the other ends overlie said hatch, thus permitting the trolleys to transport loads between the outside of the ship and the hatch without boom movement, all of said power means being mounted in said ship exteriorly of said passage and being controlled within the passage.

11. The combination with a ship having transverse bulkheads defining an athwart passage between decks, a hatch from the passage to the hold spaces, and a port in the side of the ship at each end of the passage, of a ship-carried crane, comprising, a pair of separate, independent booms in the passage, means movably mounting said booms in said passage parallel to each other in alignment with the upper corners of said ports, power means for simultaneously moving said booms on said mounting means in the same direction and amount to project the boom ends out of either of the ports, a pair of separate, independent trolleys each being mounted on one of the booms for movement over the length of the booms, power means for simultaneously moving said trolleys along the booms, a hoist sheave block dependinng from each of said trolleys, power means for simultaneously actuating said blocks, and cargo slings depending from each block to support a load therebetween, said booms being of such length that adjacent ends may project from one of the ports while the other ends overlie said hatch, thus permitting the trolleys to transport loads between the outside of the ship and the hatch without boom movement, all of said power means being mounted in said ship exteriorly of said passage and being controlled within the passage.

12. The combination with a ship having transverse bulkheads defining an athwart passage between decks, a hatch from the passage to the hold spaces, and a port in the side of the ship at each end of the passage, of a ship-carried crane, comprising, a pair of separate, independent booms in the passage, means movably mounting said booms in said passage parellel to each other in alignment with the upper corners of said ports, power means for simultaneously moving said booms on said mounting means in the same direction and amount to project the boom ends out of either of the ports, a pair of separate, independent trolleys each being mounted on one of the booms for movement over the length of the booms, power means for simultaneously moving said trolleys along the booms, a hoist sheave block depending from each of said trolleys, power means for simultaneously actuating said blocks, and cargo slings depending from each block to support a load therebetween, said booms being of such length that adjacent ends may project from one of the ports while the other ends overlie said hatch, thus permitting the trolleys to transport loads between the outside of the ship and the hatch without boom movement, all of said power means being operable separately or simultaneously without one affecting the operation of another.

JAS. W. SPEER.

REFERENCES CITED

The following references are of record in the file of this patent:

UNITED STATES PATENTS

| Number | Name | Date |
|---|---|---|
| 989,143 | Grotenrath | Apr. 11, 1911 |
| 1,084,630 | Hawthorn | Jan. 20, 1914 |
| 1,305,802 | Hulett | June 3, 1919 |
| 1,614,769 | Amsler | Jan. 18, 1927 |
| 1,975,636 | Fildes | Oct. 2, 1934 |
| 2,319,855 | Forseberg | May 25, 1943 |
| 2,343,638 | Bock | Mar. 7, 1944 |
| 2,351,478 | Boyle | June 13, 1944 |

FOREIGN PATENTS

| Number | Country | Date |
|---|---|---|
| 682,177 | France | Feb. 10, 1930 |